United States Patent
Yuan et al.

(10) Patent No.: US 10,404,504 B2
(45) Date of Patent: Sep. 3, 2019

(54) MODULATION METHOD, DEMODULATION METHOD, AND APPARATUS FOR MULTI-USER INFORMATION TRANSMISSION

(71) Applicant: ZTE CORPORATION, Shenzhen (CN)

(72) Inventors: Zhifeng Yuan, Shenzhen (CN); Jianqiang Dai, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/744,925

(22) PCT Filed: Jun. 20, 2016

(86) PCT No.: PCT/CN2016/086449
§ 371 (c)(1),
(2) Date: Jan. 15, 2018

(87) PCT Pub. No.: WO2017/016342
PCT Pub. Date: Feb. 2, 2017

(65) Prior Publication Data
US 2018/0212805 A1    Jul. 26, 2018

(30) Foreign Application Priority Data
Jul. 30, 2015 (CN) .......................... 2015 1 0459038

(51) Int. Cl.
*H04L 27/36* (2006.01)
*H04L 27/00* (2006.01)
(Continued)

(52) U.S. Cl.
CPC ..... *H04L 27/0008* (2013.01); *H04B 1/71072* (2013.01); *H04L 5/0037* (2013.01);
(Continued)

(58) Field of Classification Search
CPC combination set(s) only.
See application file for complete search history.

(56) References Cited

U.S. PATENT DOCUMENTS 10,091,046 B1 * 10/2018 Lefevre ................ H04L 1/0042
2004/0229625 A1    11/2004 Laroia
(Continued)

FOREIGN PATENT DOCUMENTS

CN         1913416 A       2/2007
CN       101577934 A      11/2009
(Continued)

OTHER PUBLICATIONS

International Search Report in international application No. PCT/CN2016/086449, dated Sep. 20, 2016, 2 pgs.
(Continued)

*Primary Examiner* — Dac V Ha
(74) *Attorney, Agent, or Firm* — Cooper Legal Group, LLC

(57) ABSTRACT

Disclosed are a modulation method, demodulation method, and apparatus for multi-user information transmission. The modulation method comprises: a transmitter determines a first modulation symbol and a second modulation symbol according to a first information bit, a second information bit, and a mapping table, the mapping table being used for determining a corresponding relation between the first information bit and the first modulation symbol and a corresponding relation between the second information bit and the second modulation symbol, each group of modulation symbols in the mapping table being superposed and mapped to a constellation diagram to achieve a Gray attribute; and the transmitter superposes the first modulation symbol and the second modulation symbol to obtain a superposed symbol.

20 Claims, 12 Drawing Sheets

(51) Int. Cl.
  *H04L 5/00* (2006.01)
  *H04L 27/34* (2006.01)
  *H04B 1/7107* (2011.01)
  *H04L 27/20* (2006.01)
  *H04L 27/22* (2006.01)
  *H04L 27/38* (2006.01)

(52) U.S. Cl.
  CPC .............. *H04L 27/20* (2013.01); *H04L 27/22* (2013.01); *H04L 27/3488* (2013.01); *H04L 27/36* (2013.01); *H04L 27/3836* (2013.01)

(56) References Cited

U.S. PATENT DOCUMENTS

| | | | |
|---|---|---|---|
| 2007/0066242 A1 | 3/2007 | Yi | |
| 2007/0270170 A1 | 11/2007 | Yoon | |
| 2009/0135926 A1* | 5/2009 | Tsouri | H04L 5/02 375/260 |
| 2010/0046644 A1 | 2/2010 | Mazet | |
| 2011/0310855 A1 | 12/2011 | Yin | |
| 2014/0362942 A1* | 12/2014 | Wood | H04B 15/00 375/267 |
| 2016/0309542 A1* | 10/2016 | Kowalski | H04W 76/27 |
| 2016/0366691 A1* | 12/2016 | Kwon | H04L 1/0001 |
| 2018/0076993 A1* | 3/2018 | Seo | H04L 27/26 |
| 2018/0262288 A1* | 9/2018 | Gao | H04J 7/00 |

FOREIGN PATENT DOCUMENTS

| | | |
|---|---|---|
| CN | 101627583 A | 1/2010 |
| CN | 101801078 A | 8/2010 |
| CN | 102547581 A | 7/2012 |
| CN | 103957432 A | 7/2014 |
| CN | 104158781 A | 11/2014 |
| WO | 2014030501 A1 | 2/2014 |

OTHER PUBLICATIONS

English Translation of the Written Opinion of the International Search Authority in international application No. PCT/CN2016/086449, dated Sep. 20, 2016, 6 pgs.

"Hierarchically Modulated Network Coding for Asymmetric Two-Way Relay Systems", Jung Min-Park, Seong-Lyun Kim and Jinho Choi, Jun. 2010, IEEE Transaction on Vehicular Technology, vol. 59, No. 5, pp. 2179-2184.

"Hybrid ARQ Technique Employing a Signal Constellation Rearrangement Based on 256-QAM", 2009,Bin Pang, Xian-Han Dai, Han Zhang, Chang-Juan Chen, Jiarr-Qiang Hao and Zhou Xiao, RadionCommunications Technology, China Academic Journal Electronic Publishing House, vol. 35, No. 2, 4 pgs.

"Hybrid Modulation Schemes for UWB Wireless Systems", A.Y. Abdalharim, SH. Shaaban and KH. El Shennawy, Mar. 2006, The 23rd National Radio Science Conference (NRSC 2006), Faculty of Electronic Engineering, Menoufiya University, Egypt, 7 pgs.

Supplementary European Search Report in European application No. 16829709.1, dated May 25, 2018, 9 pgs.

ZTE: "Potential transmission schemes for MUST", 2015, 3GPP TSG RAN WG1, Meeting #81, RT-152974,Draft; R1-152974, 3rd Generation Partnership Project, Mobile Competence Centre; 650, Route Des Lucioles; France, vol. RAN WG1, no. Fukuoka, Japan; Retrieved from the Internet: URL:http://www.3gpp.org/ftp/Meetings_3GPP SYNC/RAN1/Docs/, 6 pgs.

Huawei et al: "Candidate schemes for superposition transmission", 2015, 3GPP TSG RAN WG1 Meeting 81, RT-152493, 3rd Generation Partnership Project, Mobile Competence Centre; 650, Route Des Lucioles; France, vol. RAN WG1, no. Fukuoka, Japan; Retrieved from the Internet: URL:http://www.3gpp.org/ftp/Meetings_3GPP SYNC/RAN1/Docs/,12 pgs.

"Receiver Design for Downlink Non-Orthogonal Multiple Access (NOMA)", 2015, Chunlin Yan, Atsushi Harada, Anass Benjebbour, Yang Lan Anxin Li and Huiling Jiang, IEEE 8 Vehicular Technology Conference (VTC Spring), IEEE, 6 pgs.

* cited by examiner

MODULATION METHOD, DEMODULATION METHOD, AND APPARATUS FOR MULTI-USER INFORMATION TRANSMISSION

TECHNICAL FIELD

The present disclosure relates, but is not limited, to wireless communication, and in particular to a modulating method, demodulating method, and apparatus for multi-user information transmission.

BACKGROUND

Information for multiple users may be multiplexed in an orthogonal or non-orthogonal mode. Non-orthogonal multiplexing allows information for multiple users be transmitted on a same time-frequency resource.

With non-orthogonal multiplexing, code superposition may be applied at a transmitter, and Successive Interference Cancellation (SIC) may be applied at a receiver. For example, in downlink transmission, a transmitter may acquire a modulated symbol of a user 1 and a modulated symbol of a user 2 by respectively coding and modulating a stream of bits for the user 1 and a stream of bits for the user 2. The transmitter may acquire a superposed symbol by superposing one of the two modulated symbols on the other, and then send the superposed symbol on the same time-frequency resource. Superposition of the modulated symbols of the two users may be referred to as code superposition. With SIC, an interfering signal may be demodulated first. A signal of the user 1 may be referred to as the interfering signal, as it interferes with a signal of the user 2 that is to be demodulated. The demodulated interfering signal may be subtracted from a signal received by the user 2. The signal of the user 2 may then be demodulated.

Hierarchical modulation may be regarded as a variation of code superposition, where a constellation of a nature of Gray mapping may be acquired by mapping a combination of a stream of bits of a high priority and a stream of bits of a low priority onto a diagram of constellations. By Gray mapping, it means that combined bits mapped to adjacent constellation points on the diagram of constellations differ by but one bit. Combination of hierarchical modulation and SIC may achieve performance approaching a capacity limit. However, with hierarchical modulation, power is to be allocated separately for different streams of data, which is inflexible. It is complicated to implement capacity of a downlink channel for multiple users.

SUMMARY

Following is an overview of a subject elaborated herein. The overview is not intended to limit the scope of protection of the claims.

In related art, with hierarchical modulation, power is to be allocated separately for different streams of data, which is inflexible, leading to complicated non-orthogonal multiplexing of information for multiple users.

Embodiments herein provide a modulating method, demodulating method, and apparatus for multi-UE information transmission, capable of simplifying non-orthogonal multiplexing of information for multiple users.

A modulating method for multi-user information transmission includes:

acquiring, by a transmitter, a superposed symbol of a first modulated symbol and a second modulated symbol determined according to a first information bit, a second information bit, and a mapping table.

The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping.

The transmitter may acquire the first modulated symbol according to the first information bit and first mapping in the mapping table.

The transmitter may acquire the second modulated symbol according to the second information bit and second mapping in the mapping table.

The first mapping may correspond to multiple second mappings.

When the first information bit is of 1 bit, the transmitter may acquire the first modulated symbol by applying first Binary Phase Shift Keying (BPSK) to the first information bit.

When the first information bit is of 2 bits, the transmitter may acquire the first modulated symbol by applying first Quadri Phase Shift Keying (QPSK) to the first information bit.

When the second information bit is of 2 bits, the transmitter may acquire the second modulated symbol by applying second QPSK to the second information bit. Depending on a value of the first information bit, the second QPSK may be: flipping a sign of a real part of a modulated symbol acquired by applying the first QPSK, flipping a sign of an imaginary part of the modulated symbol acquired by applying the first QPSK, the first QPSK, or flipping both the sign of the real part and the sign of the imaginary part of the modulated symbol acquired by applying the first QPSK.

When the second information bit is of 4 bits, the transmitter may acquire the second modulated symbol by applying second 16 Quadrature Amplitude Modulation (QAM) to the second information bit. Depending on the value of the first information bit, the second 16 QAM may be: flipping a sign of a real part of a modulated symbol acquired by applying 16 QAM, flipping a sign of an imaginary part of the modulated symbol acquired by applying the 16 QAM, the 16 QAM, or flipping both the sign of the real part and the sign of the imaginary part of the modulated symbol acquired by applying the 16 QAM.

When the second information bit is of 6 bits, the transmitter may acquire the second modulated symbol by applying second 64 QAM to the second information bit. Depending on the value of the first information bit, the second 64 QAM may be: flipping a sign of a real part of a modulated symbol acquired by applying 64 QAM, flipping a sign of an imaginary part of the modulated symbol acquired by applying the 64 QAM, the 64 QAM, or flipping both the sign of the real part and the sign of the imaginary part of the modulated symbol acquired by applying the 64 QAM.

The superposed symbol may be a linear superposition of the first modulated symbol and the second modulated symbol.

The transmitter may acquire the superposed symbol of the first modulated symbol and the second modulated symbol by:

acquiring, by the transmitter, a first weighted modulated symbol as a product of the first modulated symbol and a first power factor, and acquiring a second weighted modulated symbol as a product of the second modulated symbol and a second power factor, the first power factor being a square root of a power share of the first information bit, the second power factor being a square root of a power share of the second information bit, a total of the power share of the first information bit and the power share of the second information bit being 1; and acquiring, by the transmitter, the superposed symbol as a sum of the first weighted modulated symbol and the second weighted modulated symbol.

The method may further include: before the acquiring, by a transmitter, a superposed symbol of a first modulated symbol and a second modulated symbol determined according to a first information bit, a second information bit, and a mapping table, acquiring, by the transmitter, the first information bit by coding a first stream of bits; and acquiring, by the transmitter, the second information bit by coding a second stream of bits.

The method may further include: after the acquiring, by a transmitter, a superposed symbol of a first modulated symbol and a second modulated symbol determined according to a first information bit, a second information bit, and a mapping table, forming, by the transmitter, a signal to be transmitted using the superposed symbol, and transmitting the signal to be transmitted to multiple receivers.

A demodulating method for multi-user information transmission includes:

receiving, by a receiver, a signal transmitted by a transmitter; and determining, by the receiver according to the signal and a mapping table, information sent by the transmitter to the receiver. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping.

The determining, by the receiver according to the signal and a mapping table, information sent by the transmitter to the receiver may include:

acquiring, by the receiver as a first receiver, the first modulated symbol by applying Maximum Likelihood (ML) or Minimum Mean-Square Error (MMSE) to the signal, acquiring the first information bit by demodulating the first modulated symbol according to the mapping table, and acquiring the information sent by the transmitter to the receiver by decoding the first information bit.

The determining, by the receiver according to the signal and a mapping table, information sent by the transmitter to the receiver may include:

acquiring, by the receiver as a second receiver, the first modulated symbol by applying Maximum Likelihood (ML) or Minimum Mean-Square Error (MMSE) to the signal, removing the first modulated symbol from the signal by applying Successive Interference Cancellation (SIC), acquiring the second modulated symbol by applying ML or MMSE, acquiring the second information bit by demodulating the second modulated symbol according to the mapping table, and acquiring the information sent by the transmitter to the receiver by decoding the second information bit.

A transmitter includes a first determining module and a superposing module.

The first determining module is arranged for determining, according to a first information bit, a second information bit, and a mapping table, a first modulated symbol and a second modulated symbol. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping.

The superposing module is arranged for acquiring a superposed symbol of the first modulated symbol and the second modulated symbol.

The first determining module may be arranged for acquiring the first modulated symbol according to the first information bit and first mapping in the mapping table, and acquiring the second modulated symbol according to the second information bit and second mapping in the mapping table.

The first mapping may correspond to multiple second mappings.

The determining module may be arranged for acquiring the first modulated symbol by applying one of first BPSK, first QPSK, and first QAM to the first information bit.

The first determining module may be arranged for:

in response to determining that the first information bit is of 1 bit, acquiring the first modulated symbol by applying first Binary Phase Shift Keying (BPSK) to the first information bit;

in response to determining that the first information bit is of 2 bits, acquiring the first modulated symbol by applying first Quadri Phase Shift Keying (QPSK) to the first information bit;

in response to determining that the second information bit is of 2 bits, acquiring the second modulated symbol by applying second QPSK to the second information bit, depending on a value of the first information bit, the second QPSK being: flipping a sign of a real part of a modulated symbol acquired by applying the first QPSK, flipping a sign of an imaginary part of the modulated symbol acquired by applying the first QPSK, the first QPSK, or flipping both the sign of the real part and the sign of the imaginary part of the modulated symbol acquired by applying the first QPSK;

in response to determining that the second information bit is of 4 bits, acquiring the second modulated symbol by applying second 16 Quadrature Amplitude Modulation (QAM) to the second information bit, depending on the value of the first information bit, the second 16 QAM being: flipping a sign of a real part of a modulated symbol acquired by applying 16 QAM, flipping a sign of an imaginary part of the modulated symbol acquired by applying the 16 QAM, the 16 QAM, or flipping both the sign of the real part and the sign of the imaginary part of the modulated symbol acquired by applying the 16 QAM; and in response to determining that the second information bit is of 6 bits, acquiring the second modulated symbol by applying second 64 QAM to the second information bit, depending on the value of the first information bit, the second 64 QAM being: flipping a sign of a real part of a modulated symbol acquired by applying 64 QAM, flipping a sign of an imaginary part of the modulated symbol acquired by applying the 64 QAM, the 64 QAM, or flipping both the sign of the real part and the sign of the imaginary part of the modulated symbol acquired by applying the 64 QAM.

The superposing module may be arranged for acquiring the superposed symbol as a linear superposition of the first modulated symbol and the second modulated symbol.

The superposing module may be arranged for: acquiring a first weighted modulated symbol as a product of the first modulated symbol and a first power factor, and acquiring a second weighted modulated symbol as a product of the second modulated symbol and a second power factor, the first power factor being a square root of a power share of the first information bit, the second power factor being a square root of a power share of the second information bit, a total of the power share of the first information bit and the power share of the second information bit being 1; and acquiring the superposed symbol as a sum of the first weighted modulated symbol and the second weighted modulated symbol.

The transmitter may further include a coding module arranged for acquiring the first information bit by coding a first stream of bits, and acquiring the second information bit by coding a second stream of bits.

The transmitter may further include a transmitting module arranged for forming a signal to be transmitted using the superposed symbol, and transmitting the signal to be transmitted to multiple receivers.

A receiver includes a receiving module and a second determining module.

The receiving module is arranged for receiving a signal transmitted by a transmitter.

The second determining module is arranged for determining, according to the signal and a mapping table, information sent by the transmitter to the receiver. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping.

The receiver may be a first receiver. The second determining module may be arranged for acquiring the first modulated symbol by applying Maximum Likelihood (ML) or Minimum Mean-Square Error (MMSE) to the signal, acquiring the first information bit by demodulating the first modulated symbol according to the mapping table, and acquiring the information sent by the transmitter to the receiver by decoding the first information bit.

The first receiver may be of a user at the edge.

The receiver may be a second receiver. The second determining module may be arranged for acquiring the first modulated symbol by applying Maximum Likelihood (ML) or Minimum Mean-Square Error (MMSE) to the signal, removing the first modulated symbol from the signal by applying Successive Interference Cancellation (SIC), acquiring the second modulated symbol by applying ML or MMSE, acquiring the second information bit by demodulating the second modulated symbol according to the mapping table, and acquiring the information sent by the transmitter to the receiver by decoding the second information bit.

The second receiver may be of a user near the center.

Transitory or non-transitory computer-readable storage medium has stored therein instructions that, when executed by a processor, cause the processor to perform a method according to an embodiment herein.

With embodiments herein, a transmitter determines a first modulated symbol and a second modulated symbol according to a first information bit, a second information bit, and a mapping table. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping. The transmitter acquires a superposed symbol of the first modulated symbol and the second modulated symbol. A modulated symbol may be acquired by mapping information bit with a mapping table, simplifying modulation, improving efficiency in non-orthogonal multiplexing of information for multiple users.

Any other aspect herein may be understood upon viewing and understanding the drawings and the detailed description.

BRIEF DESCRIPTION OF THE DRAWINGS

FIG. 5 is a diagram of mapping a superposed symbol onto a diagram of constellations according to an embodiment herein.

DETAILED DESCRIPTION

Embodiments herein are elaborated below with reference to the drawings. Embodiments herein and features thereof may be combined with A other as long as no conflict results from the combination.

Figure 1:
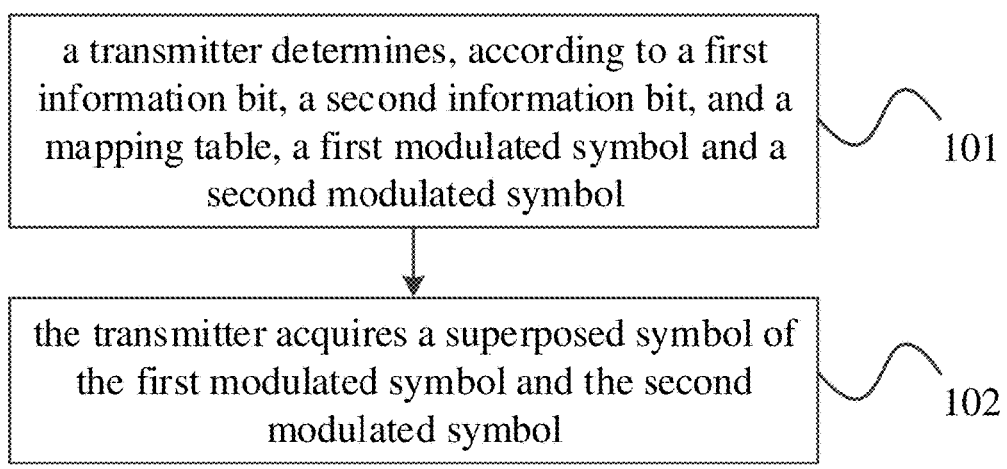
FIG. 1 is a flowchart of a modulating method for multi-user information transmission according to an embodiment herein.
Figure 2:
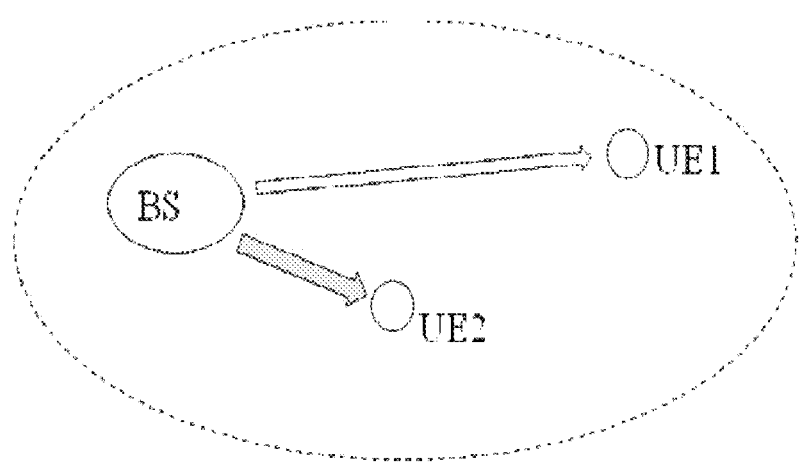
FIG. 2 is a diagram of a scene where multi-user information transmission applies according to an embodiment herein.

FIG. 1 is a flowchart of a modulating method for multi-user information transmission according to an embodiment herein. FIG. 2 is a diagram of a scene where multi-user information transmission applies according to an embodiment herein. As shown in FIG. 2, a transmitter, such as a Base Station (BS), may send user information to first User Equipment (UE) 1 and UE 2 on a same time-frequency resource. UE may extract and demodulate information for a user per se from the mixed signal. The UE 1 may be of a user at an edge who is far away from the transmitter I. The UE 2 may be of a user near a center who is close to the transmitter. As shown in FIG. 1, a modulating method for multi-user information transmission according to an embodiment herein includes steps as follows.

In step 101, a transmitter determines, according to a first information bit, a second information bit, and a mapping table, a first modulated symbol and a second modulated symbol.

The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping.

The mapping table may include multiple sets of information bits and multiple sets of modulated symbols corresponding respectively to the multiple sets of information bits. A set of modulated symbols may include two modulated symbols (e.g., the first modulated symbol and the second modulated symbol). A set of information bits in the mapping table may be mapped to modulated symbols corresponding respectively to the set of information bits by a mapping relation. The first information bit may be mapped to the first modulated symbol by first mapping. The second information bit may be mapped to the second modulated symbol by second mapping. The first modulated symbol may be acquired according to the first information bit and the first mapping in the mapping table. The second modulated symbol may be acquired according to the second information bit and the second mapping in the mapping table. The first mapping may correspond to multiple second mappings.

The first mapping may constitute part of mappings in the mapping table. The second mapping may constitute part of the mappings in the mapping table. In the mapping table, when the first modulated symbol is acquired by mapping the first information bit using one mapping, the second modulated symbol may be acquired by mapping the second information bit using one of multiple mappings.

When the first information bit is of 1 bit, the transmitter may acquire the first modulated symbol by applying first Binary Phase Shift Keying (BPSK) to the first information bit.

When the first information bit is of 2 bits, the transmitter may acquire the first modulated symbol by applying first Quadri Phase Shift Keying (QPSK) to the first information bit.

When the second information bit is of 2 bits, the transmitter may acquire the second modulated symbol by applying second QPSK to the second information bit. The second QPSK may be performed as one of mappings as follows, depending on a value of the first information bit. A sign of a real part of a modulated symbol acquired by applying the first QPSK may be flipped. A sign of an imaginary part of the modulated symbol acquired by applying the first QPSK may be flipped. The first QPSK may be performed. Alternatively, both the sign of the real part and the sign of the imaginary part of the modulated symbol acquired by applying the first QPSK may be flipped.

When the second information bit is of 4 bits, the transmitter may acquire the second modulated symbol by applying second 16 Quadrature Amplitude Modulation (QAM) to the second information bit. The second 16 QAM may be performed as one of mappings as follows, depending on the value of the first information bit. A sign of a real part of a modulated symbol acquired by applying 16 QAM may be flipped. A sign of an imaginary part of the modulated symbol acquired by applying the 16 QAM may be flipped. The 16 QAM may be performed. Alternatively, both the sign of the real part and the sign of the imaginary part of the modulated symbol acquired by applying the 16 QAM may be flipped.

When the second information bit is of 6 bits, the transmitter may acquire the second modulated symbol by applying second 64 QAM to the second information bit. The second 64 QAM may be performed as one of mappings as follows, depending on the value of the first information bit. A sign of a real part of a modulated symbol acquired by applying 64 QAM may be flipped. A sign of an imaginary part of the modulated symbol acquired by applying the 64 QAM may be flipped. The 64 QAM may be performed. Alternatively, both the sign of the real part and the sign of the imaginary part of the modulated symbol acquired by applying the 64 QAM may be flipped.

In step 102, the transmitter acquires a superposed symbol of the first modulated symbol and the second modulated symbol.

A superposed symbol may be acquired by superposing a first modulated symbol and a second modulated symbol. A superposed symbol may be mapped to a constellation point on the diagram of constellations. Any possible superposed symbol may be acquired by superposing any possible first modulated symbol and any possible second modulated symbol. The any possible superposed symbol may be mapped to any possible constellation point constituting the diagram of constellations. The diagram of constellations may be of the nature of Gray mapping.

The superposed symbol may be acquired as a linear superposition of the first modulated symbol and the second modulated symbol.

A first weighted modulated symbol may be acquired as a product of the first modulated symbol and a first power factor. A second weighted modulated symbol may be acquired as a product of the second modulated symbol and a second power factor. The first power factor may be a square root of a power share of the first information bit. The second power factor may be a square root of a power share of the second information bit. A total of the power share of the first information bit and the power share of the second information bit may be 1. The superposed symbol may be acquired as a sum of the first weighted modulated symbol and the second weighted modulated symbol.

A transmitter determines a first modulated symbol and a second modulated symbol according to a first information bit, a second information bit, and a mapping table. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping. The transmitter acquires a superposed symbol of the first modulated symbol and the second modulated symbol. A superposed modulated symbol may be acquired according to a mapping table, such that two sets of information bits may be mapped to a constellation of the nature of Gray mapping, simplifying non-orthogonal multiplexing of information for multiple users.

Before the transmitter acquires the superposed symbol of the first modulated symbol and the second modulated symbol determined according to the first information bit, the second information bit, and the mapping table, the transmitter may acquire the first information bit by coding a first stream of bits, and acquire the second information bit by coding a second stream of bits.

Namely, the transmitter may acquire a stream of bit information by coding that matches a condition of a channel between the transmitter and a receiver (i.e., UE).

Figure 3:
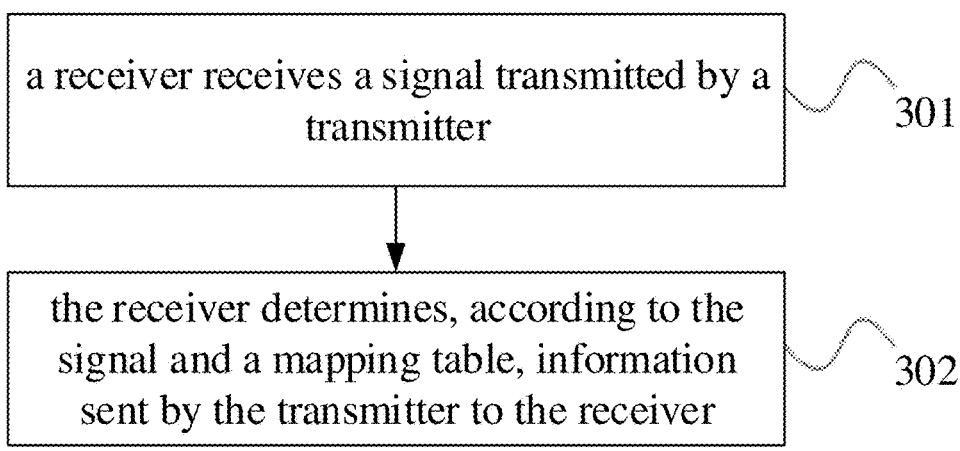
FIG. 3 is a flowchart of a demodulating method for multi-user information transmission according to an embodiment herein.

FIG. 3 is a flowchart of a demodulating method for multi-user information transmission according to an embodiment herein. As shown in FIG. 3, the demodulating method for multi-user information transmission includes steps as follows.

In step 301, a receiver receives a signal transmitted by a transmitter.

The signal may be acquired by the transmitter as a superposed symbol of a first modulated symbol and a second modulated symbol. The first modulated symbol and the second modulated symbol may be determined according to a first information bit, a second information bit, and a mapping table.

In step 302, the receiver determines, according to the signal and a mapping table, information sent by the transmitter to the receiver.

The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping.

A receiver receives a signal transmitted by a transmitter. The receiver determines, according to the signal and a mapping table, information sent by the transmitter to the receiver. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping. Information for a user is acquired according to a received signal and a mapping table, simplifying demodulation, improving efficiency in non-orthogonal multiplexing of information for multiple users.

The step 302 may include steps as follows.

The receiver may be a first receiver. The receiver may acquire the first modulated symbol by applying Maximum Likelihood (ML) or Minimum Mean-Square Error (MMSE) to the signal. The receiver may acquire the first information bit by demodulating the first modulated symbol according to the mapping table. The receiver may acquire the information sent by the transmitter to the receiver by decoding the first information bit.

The first receiver may be of a user at the edge.

The receiver may be a second receiver. The receiver may acquire the first modulated symbol by applying Maximum Likelihood (ML) or Minimum Mean-Square Error (MMSE) to the signal. The receiver may remove the first modulated symbol from the signal by applying Successive Interference Cancellation (SIC). The receiver may acquire the second modulated symbol by applying ML or MMSE. The receiver may acquire the second information bit by demodulating the second modulated symbol according to the mapping table. The receiver may acquire the information sent by the transmitter to the receiver by decoding the second information bit.

The second receiver may be of a user near the center.

Figure 4:
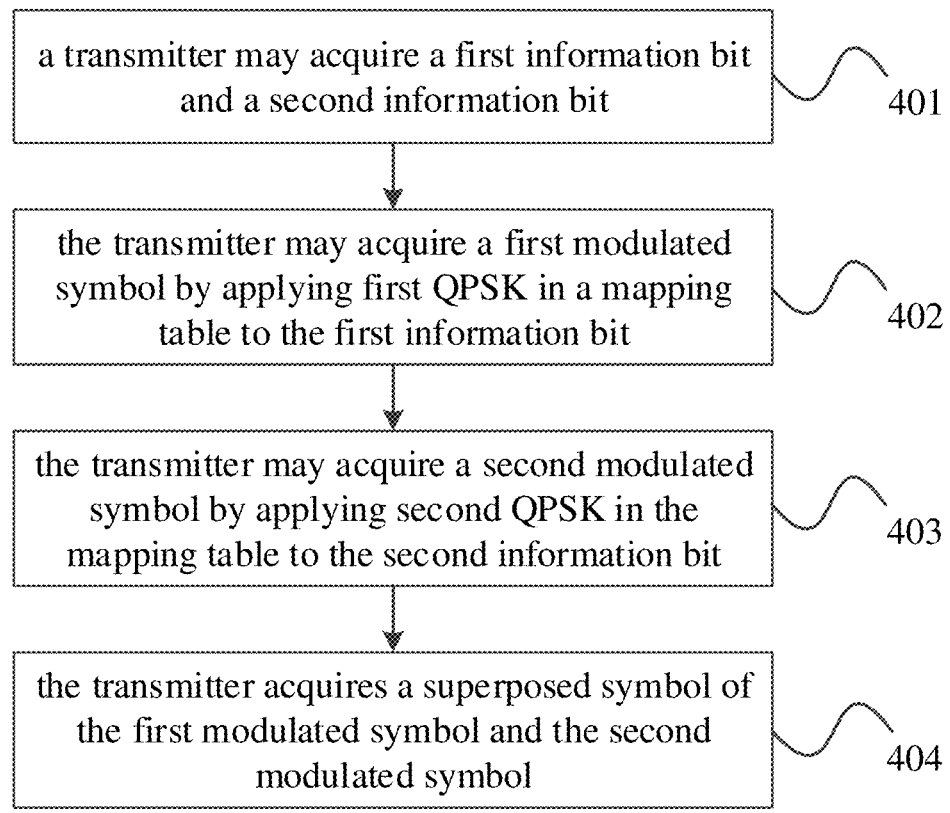
FIG. 4 is a flowchart of a modulating method for multi-user information transmission according to an embodiment herein.

FIG. 4 is a flowchart of a modulating method for multi-user information transmission according to an embodiment herein. FIG. 5 is a diagram of mapping a superposed symbol onto a diagram of constellations according to an embodiment herein. As shown in FIG. 4, a modulating method for multi-user information transmission may include steps as follows.

In step 401, a transmitter may acquire a first information bit and a second information bit.

The transmitter may acquire a stream of bit information by coding that matches a condition of a channel between the transmitter and a receiver (i.e., UE).

In step 402, the transmitter may acquire a first modulated symbol by applying first QPSK in a mapping table to the first information bit.

In step 403, the transmitter may acquire a second modulated symbol by applying second QPSK in the mapping table to the second information bit.

The mapping table may be as shown in Table 1.

TABLE 1

| No. | 1st info bit | 2nd info bit | 1st modulated symbol | 2nd modulated symbol |
|---|---|---|---|---|
| 1 | 00 | 00 | $1\sqrt{2} + 1\sqrt{2} \cdot j$ | $1\sqrt{2} + 1\sqrt{2} \cdot j$ |
| 2 | 00 | 10 | $1\sqrt{2} + 1\sqrt{2} \cdot j$ | $-1\sqrt{2} + 1\sqrt{2} \cdot j$ |
| 3 | 00 | 11 | $1\sqrt{2} + 1\sqrt{2} \cdot j$ | $-1\sqrt{2} - 1\sqrt{2} \cdot j$ |
| 4 | 00 | 01 | $1\sqrt{2} + 1\sqrt{2} \cdot j$ | $1\sqrt{2} - 1\sqrt{2} \cdot j$ |
| 5 | 10 | 00 | $-1\sqrt{2} + 1\sqrt{2} \cdot j$ | $-1\sqrt{2} + 1\sqrt{2} \cdot j$ |
| 6 | 10 | 10 | $-1\sqrt{2} + 1\sqrt{2} \cdot j$ | $1\sqrt{2} + 1\sqrt{2} \cdot j$ |
| 7 | 10 | 11 | $-1\sqrt{2} + 1\sqrt{2} \cdot j$ | $1\sqrt{2} - 1\sqrt{2} \cdot j$ |
| 8 | 10 | 01 | $-1\sqrt{2} + 1\sqrt{2} \cdot j$ | $-1\sqrt{2} - 1\sqrt{2} \cdot j$ |
| 9 | 11 | 00 | $-1\sqrt{2} - 1\sqrt{2} \cdot j$ | $-1\sqrt{2} - 1\sqrt{2} \cdot j$ |
| 10 | 11 | 10 | $-1\sqrt{2} - 1\sqrt{2} \cdot j$ | $1\sqrt{2} - 1\sqrt{2} \cdot j$ |
| 11 | 11 | 11 | $-1\sqrt{2} - 1\sqrt{2} \cdot j$ | $1\sqrt{2} + 1\sqrt{2} \cdot j$ |
| 12 | 11 | 01 | $-1\sqrt{2} - 1\sqrt{2} \cdot j$ | $-1\sqrt{2} + 1\sqrt{2} \cdot j$ |
| 13 | 01 | 00 | $1\sqrt{2} - 1\sqrt{2} \cdot j$ | $1\sqrt{2} - 1\sqrt{2} \cdot j$ |
| 14 | 01 | 10 | $1\sqrt{2} - 1\sqrt{2} \cdot j$ | $-1\sqrt{2} - 1\sqrt{2} \cdot j$ |
| 15 | 01 | 11 | $1\sqrt{2} - 1\sqrt{2} \cdot j$ | $-1\sqrt{2} + 1\sqrt{2} \cdot j$ |
| 16 | 01 | 01 | $1\sqrt{2} - 1\sqrt{2} \cdot j$ | $1\sqrt{2} + 1\sqrt{2} \cdot j$ |

A row in the mapping table in Table 1 may include two sets of information bits and two modulated symbols corresponding respectively to the two sets of information bits. The two modulated symbols may form a set of modulated symbols. Superposition of a set of modulated symbols in the mapping table may be mapped onto the diagram of constellations of the nature of Gray mapping.

In step 404, the transmitter acquires a superposed symbol of the first modulated symbol and the second modulated symbol.

A first modulated symbol X1 and a second modulated symbol X2 may be linearly superposed. $X = X1 \cdot a1 + X2 \cdot a2$ may be acquired by superposing a product of the first modulated symbol X1 and a power factor a1, and a product of the second modulated symbol X2 and a power factor a2. A superposed symbol may be acquired by superposing a first modulated symbol and a second modulated symbol. A superposed symbol may be mapped to a constellation point on the diagram of constellations. According to Table 1, there may be 16 possible superposed symbols of first modulated symbol and second modulated symbol. Any possible superposed symbol may be mapped onto the diagram of constellations of the nature of Gray mapping. FIG. 5 is the diagram of constellations of superposed symbols acquired by superposing first modulated symbols and second modulated symbols mapped according to Table 1 when a1:a2=4:1.

A superposed symbol X may be mapped onto a time-frequency resource and sent to a receiver.

A receiver UE may receive a signal transmitted by the transmitter. The signal transmitted by the transmitter may be acquired according to an aforementioned embodiment herein. The receiver may demodulate information according to a mapping table, as shown in FIG. 5.

Assume that the signal is transmitted on a channel of an Additive White Gaussian Noise (AWGN). The signal may interfere with but an additive white noise. A data symbol, namely, a superposed symbol, may interfere with the noise. Therefore, a received symbol may be mapped to a point on the diagram of constellations that deviates from a superposed constellation point by a Euclidean distance.

A receiver of a user at the edge may directly demodulate information for the user with interference from information for a user near the center and interference from the noise. For example, the receiver may acquire the first modulated symbol by applying Maximum Likelihood (ML) or Minimum Mean-Square Error (MMSE). The receiver may acquire the first information bit by demodulating the first modulated symbol by mapping according to Table 1. The receiver may acquire the information for the user at the edge by decoding the first information bit.

A receiver of a user near the center may acquire the first modulated symbol according to the diagram of superposed constellations by applying ML or MMSE. The receiver may remove the first modulated symbol from the signal by applying SIC. The receiver may acquire the second modulated symbol by applying ML or MMSE. The receiver may acquire the second information bit by demodulating the second modulated symbol by mapping according to Table 1. The receiver may acquire the information for the user near the center by decoding the second information bit.

A superposed modulated symbol may be acquired according to a mapping table, such that two sets of information bits may be mapped to a constellation of the nature of Gray mapping, simplifying non-orthogonal multiplexing of information for multiple users.

Figure 6:
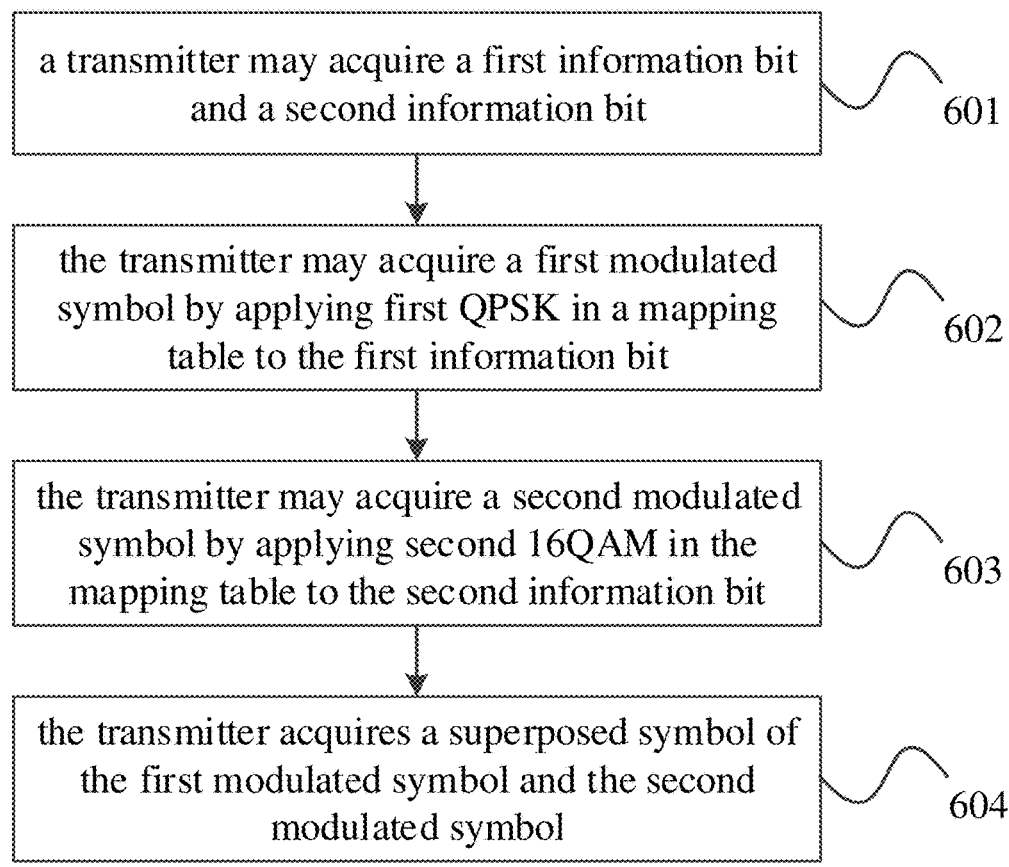
FIG. 6 is a flowchart of a modulating method for multi-user information transmission according to an embodiment herein.
Figure 7:
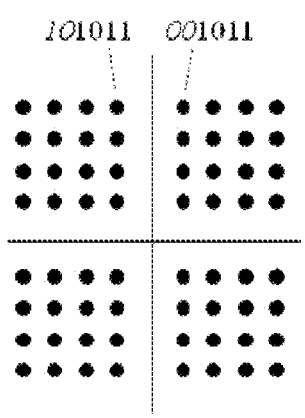
FIG. 7 is a diagram of mapping a superposed symbol onto a diagram of constellations according to an embodiment herein.

FIG. 6 is a flowchart of a modulating method for multi-user information transmission according to an embodiment herein. FIG. 7 is a diagram of mapping a superposed symbol onto a diagram of constellations according to an embodiment herein. As shown in FIG. 6, a modulating method for multi-user information transmission may include steps as follows.

In step 601, a transmitter may acquire a first information bit and a second information bit.

The transmitter may acquire a stream of bit information by coding that matches a condition of a channel between the transmitter and a receiver (i.e., UE).

In step 602, the transmitter may acquire a first modulated symbol by applying first QPSK in a mapping table to the first information bit.

In step 603, the transmitter may acquire a second modulated symbol by applying second 16QAM in the mapping table to the second information bit.

The mapping table may be as shown in Table 2.

TABLE 2

| No. | 1st info bit | 2nd info bit | 1st modulated symbol | 2nd modulated symbol |
|---|---|---|---|---|
| 1 | 00 | 0000 | $1\sqrt{2} + 1\sqrt{2} \cdot j$ | $1\sqrt{10} + 1\sqrt{10} \cdot j$ |
| 2 | 00 | 0001 | $1\sqrt{2} + 1\sqrt{2} \cdot j$ | $1\sqrt{10} + 3\sqrt{10} \cdot j$ |
| 3 | 00 | 0010 | $1\sqrt{2} + 1\sqrt{2} \cdot j$ | $3\sqrt{10} + 1\sqrt{10} \cdot j$ |
| 4 | 00 | 0011 | $1\sqrt{2} + 1\sqrt{2} \cdot j$ | $3\sqrt{10} + 3\sqrt{10} \cdot j$ |
| 5 | 00 | 0100 | $1\sqrt{2} + 1\sqrt{2} \cdot j$ | $1\sqrt{10} - 1\sqrt{10} \cdot j$ |
| 6 | 00 | 0101 | $1\sqrt{2} + 1\sqrt{2} \cdot j$ | $1\sqrt{10} - 3\sqrt{10} \cdot j$ |
| 7 | 00 | 0110 | $1\sqrt{2} + 1\sqrt{2} \cdot j$ | $3\sqrt{10} - 1\sqrt{10} \cdot j$ |
| 8 | 00 | 0111 | $1\sqrt{2} + 1\sqrt{2} \cdot j$ | $3\sqrt{10} - 3\sqrt{10} \cdot j$ |
| 9 | 00 | 1000 | $1\sqrt{2} + 1\sqrt{2} \cdot j$ | $-1\sqrt{10} + 1\sqrt{10} \cdot j$ |
| 10 | 00 | 1001 | $1\sqrt{2} + 1\sqrt{2} \cdot j$ | $-1\sqrt{10} + 3\sqrt{10} \cdot j$ |
| 11 | 00 | 1010 | $1\sqrt{2} + 1\sqrt{2} \cdot j$ | $-3\sqrt{10} + 1\sqrt{10} \cdot j$ |
| 12 | 00 | 1011 | $1\sqrt{2} + 1\sqrt{2} \cdot j$ | $-3\sqrt{10} + 3\sqrt{10} \cdot j$ |
| 13 | 00 | 1100 | $1\sqrt{2} + 1\sqrt{2} \cdot j$ | $-1\sqrt{10} - 1\sqrt{10} \cdot j$ |
| 14 | 00 | 1101 | $1\sqrt{2} + 1\sqrt{2} \cdot j$ | $-1\sqrt{10} - 3\sqrt{10} \cdot j$ |
| 15 | 00 | 1110 | $1\sqrt{2} + 1\sqrt{2} \cdot j$ | $-3\sqrt{10} - 1\sqrt{10} \cdot j$ |
| 16 | 00 | 1111 | $1\sqrt{2} + 1\sqrt{2} \cdot j$ | $-3\sqrt{10} - 3\sqrt{10} \cdot j$ |
| 17 | 10 | 0000 | $-1\sqrt{2} + 1\sqrt{2} \cdot j$ | $-1\sqrt{10} + 1\sqrt{10} \cdot j$ |
| 18 | 10 | 0001 | $-1\sqrt{2} + 1\sqrt{2} \cdot j$ | $-1\sqrt{10} + 3\sqrt{10} \cdot j$ |
| 19 | 10 | 0010 | $-1\sqrt{2} + 1\sqrt{2} \cdot j$ | $-3\sqrt{10} + 1\sqrt{10} \cdot j$ |
| 20 | 10 | 0011 | $-1\sqrt{2} + 1\sqrt{2} \cdot j$ | $-3\sqrt{10} + 3\sqrt{10} \cdot j$ |
| 21 | 10 | 0100 | $-1\sqrt{2} + 1\sqrt{2} \cdot j$ | $-1\sqrt{10} - 1\sqrt{10} \cdot j$ |
| 22 | 10 | 0101 | $-1\sqrt{2} + 1\sqrt{2} \cdot j$ | $-1\sqrt{10} - 3\sqrt{10} \cdot j$ |
| 23 | 10 | 0110 | $-1\sqrt{2} + 1\sqrt{2} \cdot j$ | $-3\sqrt{10} - 1\sqrt{10} \cdot j$ |
| 24 | 10 | 0111 | $-1\sqrt{2} + 1\sqrt{2} \cdot j$ | $-3\sqrt{10} - 3\sqrt{10} \cdot j$ |
| 25 | 10 | 1000 | $-1\sqrt{2} + 1\sqrt{2} \cdot j$ | $1\sqrt{10} + 1\sqrt{10} \cdot j$ |
| 26 | 10 | 1001 | $-1\sqrt{2} + 1\sqrt{2} \cdot j$ | $1\sqrt{10} + 3\sqrt{10} \cdot j$ |
| 27 | 10 | 1010 | $-1\sqrt{2} + 1\sqrt{2} \cdot j$ | $3\sqrt{10} + 1\sqrt{10} \cdot j$ |
| 28 | 10 | 1011 | $-1\sqrt{2} + 1\sqrt{2} \cdot j$ | $3\sqrt{10} + 3\sqrt{10} \cdot j$ |
| 29 | 10 | 1100 | $-1\sqrt{2} + 1\sqrt{2} \cdot j$ | $1\sqrt{10} - 1\sqrt{10} \cdot j$ |
| 30 | 10 | 1101 | $-1\sqrt{2} + 1\sqrt{2} \cdot j$ | $1\sqrt{10} - 3\sqrt{10} \cdot j$ |
| 31 | 10 | 1110 | $-1\sqrt{2} + 1\sqrt{2} \cdot j$ | $3\sqrt{10} - 1\sqrt{10} \cdot j$ |
| 32 | 10 | 1111 | $-1\sqrt{2} + 1\sqrt{2} \cdot j$ | $3\sqrt{10} - 3\sqrt{10} \cdot j$ |
| 33 | 11 | 0000 | $-1\sqrt{2} - 1\sqrt{2} \cdot j$ | $-1\sqrt{10} - 1\sqrt{10} \cdot j$ |
| 34 | 11 | 0001 | $-1\sqrt{2} - 1\sqrt{2} \cdot j$ | $-1\sqrt{10} - 3\sqrt{10} \cdot j$ |
| 35 | 11 | 0010 | $-1\sqrt{2} - 1\sqrt{2} \cdot j$ | $-3\sqrt{10} - 1\sqrt{10} \cdot j$ |
| 36 | 11 | 0011 | $-1\sqrt{2} - 1\sqrt{2} \cdot j$ | $-3\sqrt{10} - 3\sqrt{10} \cdot j$ |
| 37 | 11 | 0100 | $-1\sqrt{2} - 1\sqrt{2} \cdot j$ | $-1\sqrt{10} + 1\sqrt{10} \cdot j$ |
| 38 | 11 | 0101 | $-1\sqrt{2} - 1\sqrt{2} \cdot j$ | $-1\sqrt{10} + 3\sqrt{10} \cdot j$ |
| 39 | 11 | 0110 | $-1\sqrt{2} - 1\sqrt{2} \cdot j$ | $-3\sqrt{10} + 1\sqrt{10} \cdot j$ |
| 40 | 11 | 0111 | $-1\sqrt{2} - 1\sqrt{2} \cdot j$ | $-3\sqrt{10} + 3\sqrt{10} \cdot j$ |
| 41 | 11 | 1000 | $-1\sqrt{2} - 1\sqrt{2} \cdot j$ | $1\sqrt{10} - 1\sqrt{10} \cdot j$ |
| 42 | 11 | 1001 | $-1\sqrt{2} - 1\sqrt{2} \cdot j$ | $1\sqrt{10} - 3\sqrt{10} \cdot j$ |
| 43 | 11 | 1010 | $-1\sqrt{2} - 1\sqrt{2} \cdot j$ | $3\sqrt{10} - 1\sqrt{10} \cdot j$ |
| 44 | 11 | 1011 | $-1\sqrt{2} - 1\sqrt{2} \cdot j$ | $3\sqrt{10} - 3\sqrt{10} \cdot j$ |
| 45 | 11 | 1100 | $-1\sqrt{2} - 1\sqrt{2} \cdot j$ | $1\sqrt{10} + 1\sqrt{10} \cdot j$ |
| 46 | 11 | 1101 | $-1\sqrt{2} - 1\sqrt{2} \cdot j$ | $1\sqrt{10} + 3\sqrt{10} \cdot j$ |
| 47 | 11 | 1110 | $-1\sqrt{2} - 1\sqrt{2} \cdot j$ | $3\sqrt{10} + 1\sqrt{10} \cdot j$ |
| 48 | 11 | 1111 | $-1\sqrt{2} - 1\sqrt{2} \cdot j$ | $3\sqrt{10} + 3\sqrt{10} \cdot j$ |
| 49 | 01 | 0000 | $1\sqrt{2} - 1\sqrt{2} \cdot j$ | $1\sqrt{10} - 1\sqrt{10} \cdot j$ |
| 50 | 01 | 0001 | $1\sqrt{2} - 1\sqrt{2} \cdot j$ | $1\sqrt{10} - 3\sqrt{10} \cdot j$ |
| 51 | 01 | 0010 | $1\sqrt{2} - 1\sqrt{2} \cdot j$ | $3\sqrt{10} - 1\sqrt{10} \cdot j$ |
| 52 | 01 | 0011 | $1\sqrt{2} - 1\sqrt{2} \cdot j$ | $3\sqrt{10} - 3\sqrt{10} \cdot j$ |
| 53 | 01 | 0100 | $1\sqrt{2} - 1\sqrt{2} \cdot j$ | $1\sqrt{10} + 1\sqrt{10} \cdot j$ |
| 54 | 01 | 0101 | $1\sqrt{2} - 1\sqrt{2} \cdot j$ | $1\sqrt{10} + 3\sqrt{10} \cdot j$ |
| 55 | 01 | 0110 | $1\sqrt{2} - 1\sqrt{2} \cdot j$ | $3\sqrt{10} + 1\sqrt{10} \cdot j$ |
| 56 | 01 | 0111 | $1\sqrt{2} - 1\sqrt{2} \cdot j$ | $3\sqrt{10} + 3\sqrt{10} \cdot j$ |
| 57 | 01 | 1000 | $1\sqrt{2} - 1\sqrt{2} \cdot j$ | $-1\sqrt{10} - 1\sqrt{10} \cdot j$ |
| 58 | 01 | 1001 | $1\sqrt{2} - 1\sqrt{2} \cdot j$ | $-1\sqrt{10} - 3\sqrt{10} \cdot j$ |
| 59 | 01 | 1010 | $1\sqrt{2} - 1\sqrt{2} \cdot j$ | $-3\sqrt{10} - 1\sqrt{10} \cdot j$ |
| 60 | 01 | 1011 | $1\sqrt{2} - 1\sqrt{2} \cdot j$ | $-3\sqrt{10} - 3\sqrt{10} \cdot j$ |
| 61 | 01 | 1100 | $1\sqrt{2} - 1\sqrt{2} \cdot j$ | $-1\sqrt{10} + 1\sqrt{10} \cdot j$ |
| 62 | 01 | 1101 | $1\sqrt{2} - 1\sqrt{2} \cdot j$ | $-1\sqrt{10} + 3\sqrt{10} \cdot j$ |
| 63 | 01 | 1110 | $1\sqrt{2} - 1\sqrt{2} \cdot j$ | $-3\sqrt{10} + 1\sqrt{10} \cdot j$ |
| 64 | 01 | 1111 | $1\sqrt{2} - 1\sqrt{2} \cdot j$ | $-3\sqrt{10} + 3\sqrt{10} \cdot j$ |

In step 604, the transmitter acquires a superposed symbol of the first modulated symbol and the second modulated symbol.

A first modulated symbol X1 and a second modulated symbol X2 may be linearly superposed. $X=X1 \cdot a1+X2 \cdot a2$ may be acquired by superposing a product of the first modulated symbol X1 and a power factor a1, and a product of the second modulated symbol X2 and a power factor a2. A superposed symbol may be acquired by superposing a first modulated symbol and a second modulated symbol. A superposed symbol may be mapped to a constellation point on the diagram of constellations. According to Table 2, there may be 64 possible superposed symbols of first modulated symbol and second modulated symbol. Any possible superposed symbol may be mapped onto the diagram of constellations of the nature of Gray mapping. FIG. 7 is the diagram of constellations of superposed symbols acquired by superposing first modulated symbols and second modulated symbols mapped according to Table 2 when a1:a2=4:1.

Figure 8:
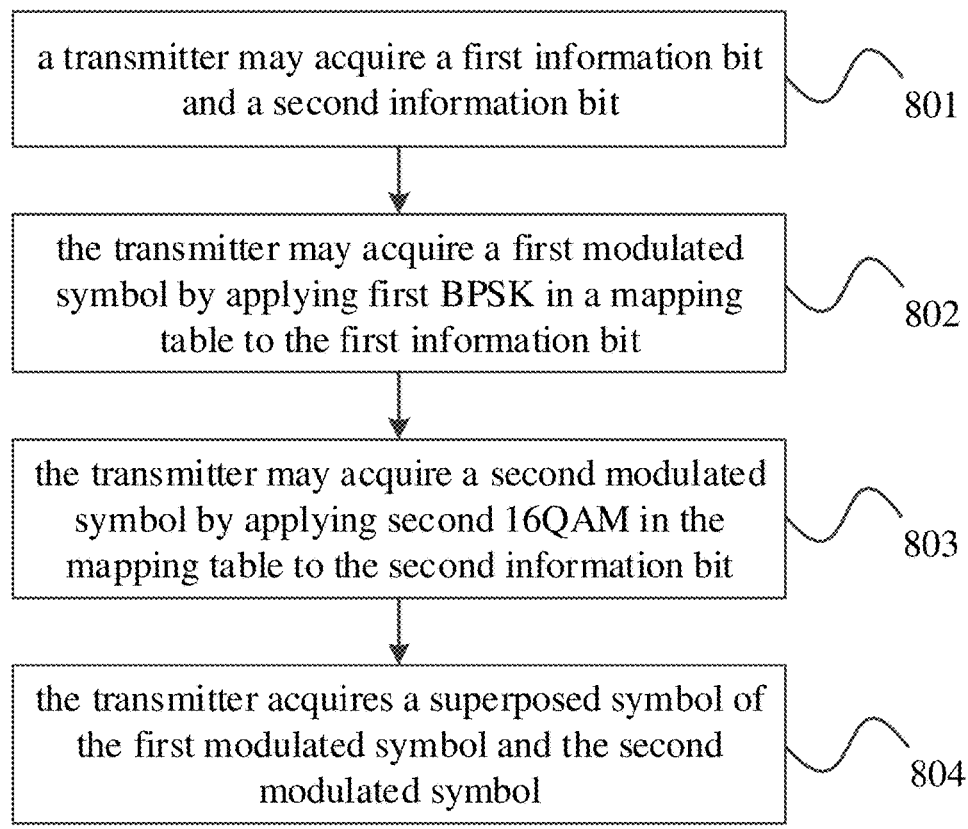
FIG. 8 is a flowchart of a modulating method for multi-user information transmission according to an embodiment herein.
Figure 9:
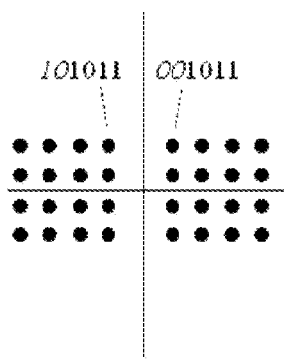
FIG. 9 is a diagram of mapping a superposed symbol onto a diagram of constellations according to an embodiment herein.

FIG. 8 is a flowchart of a modulating method for multi-user information transmission according to an embodiment herein. FIG. 9 is a diagram of mapping a superposed symbol onto a diagram of constellations according to an embodiment herein. As shown in FIG. 8, a modulating method for multi-user information transmission may include steps as follows.

In step 801, a transmitter may acquire a first information bit and a second information bit.

The transmitter may acquire a stream of bit information by coding that matches a condition of a channel between the transmitter and a receiver (i.e., UE).

In step 802, the transmitter may acquire a first modulated symbol by applying first BPSK in a mapping table to the first information bit.

In step 803, the transmitter may acquire a second modulated symbol by applying second 16QAM in the mapping table to the second information bit.

The mapping table may be as shown in Table 3.

TABLE 3

| No. | 1st info bit | 2nd info bit | 1st modulated symbol | 2nd modulated symbol |
|---|---|---|---|---|
| 1 | 0 | 0000 | 1 | $1\sqrt{10} + 1\sqrt{10} \cdot j$ |
| 2 | 0 | 0001 | 1 | $1\sqrt{10} + 3\sqrt{10} \cdot j$ |
| 3 | 0 | 0010 | 1 | $3\sqrt{10} + 1\sqrt{10} \cdot j$ |
| 4 | 0 | 0011 | 1 | $3\sqrt{10} + 3\sqrt{10} \cdot j$ |
| 5 | 0 | 0100 | 1 | $1\sqrt{10} - 1\sqrt{10} \cdot j$ |
| 6 | 0 | 0101 | 1 | $1\sqrt{10} - 3\sqrt{10} \cdot j$ |
| 7 | 0 | 0110 | 1 | $3\sqrt{10} - 1\sqrt{10} \cdot j$ |
| 8 | 0 | 0111 | 1 | $3\sqrt{10} - 3\sqrt{10} \cdot j$ |
| 9 | 0 | 1000 | 1 | $-1\sqrt{10} + 1\sqrt{10} \cdot j$ |
| 10 | 0 | 1001 | 1 | $-1\sqrt{10} + 3\sqrt{10} \cdot j$ |
| 11 | 0 | 1010 | 1 | $-3\sqrt{10} + 1\sqrt{10} \cdot j$ |
| 12 | 0 | 1011 | 1 | $-3\sqrt{10} + 3\sqrt{10} \cdot j$ |
| 13 | 0 | 1100 | 1 | $-1\sqrt{10} - 1\sqrt{10} \cdot j$ |
| 14 | 0 | 1101 | 1 | $-1\sqrt{10} - 3\sqrt{10} \cdot j$ |
| 15 | 0 | 1110 | 1 | $-3\sqrt{10} - 1\sqrt{10} \cdot j$ |
| 16 | 0 | 1111 | 1 | $-3\sqrt{10} - 3\sqrt{10} \cdot j$ |
| 17 | 1 | 0000 | j | $-1\sqrt{10} + 1\sqrt{10} \cdot j$ |
| 18 | 1 | 0001 | j | $-1\sqrt{10} + 3\sqrt{10} \cdot j$ |
| 19 | 1 | 0010 | j | $-3\sqrt{10} + 1\sqrt{10} \cdot j$ |
| 20 | 1 | 0011 | j | $-3\sqrt{10} + 3\sqrt{10} \cdot j$ |
| 21 | 1 | 0100 | j | $-1\sqrt{10} - 1\sqrt{10} \cdot j$ |
| 22 | 1 | 0101 | j | $-1\sqrt{10} - 3\sqrt{10} \cdot j$ |
| 23 | 1 | 0110 | j | $-3\sqrt{10} - 1\sqrt{10} \cdot j$ |
| 24 | 1 | 0111 | j | $-3\sqrt{10} - 3\sqrt{10} \cdot j$ |
| 25 | 1 | 1000 | j | $1\sqrt{10} + 1\sqrt{10} \cdot j$ |
| 26 | 1 | 1001 | j | $1\sqrt{10} + 3\sqrt{10} \cdot j$ |
| 27 | 1 | 1010 | j | $3\sqrt{10} + 1\sqrt{10} \cdot j$ |
| 28 | 1 | 1011 | j | $3\sqrt{10} + 3\sqrt{10} \cdot j$ |
| 29 | 1 | 1100 | j | $1\sqrt{10} - 1\sqrt{10} \cdot j$ |
| 30 | 1 | 1101 | j | $1\sqrt{10} - 3\sqrt{10} \cdot j$ |
| 31 | 1 | 1110 | j | $3\sqrt{10} - 1\sqrt{10} \cdot j$ |
| 32 | 1 | 1111 | j | $3\sqrt{10} - 3\sqrt{10} \cdot j$ |

In step 804, the transmitter acquires a superposed symbol of the first modulated symbol and the second modulated symbol.

A first modulated symbol X1 and a second modulated symbol X2 may be linearly superposed. $X=X1 \cdot a1+X2 \cdot a2$ may be acquired by superposing a product of the first modulated symbol X1 and a power factor a1, and a product of the second modulated symbol X2 and a power factor a2. A superposed symbol may be acquired by superposing a first modulated symbol and a second modulated symbol. A superposed symbol may be mapped to a constellation point on the diagram of constellations. According to Table 3, there may be 32 possible superposed symbols of first modulated symbol and second modulated symbol. Any possible superposed symbol may be mapped onto the diagram of constellations of the nature of Gray mapping. FIG. 9 is the diagram of constellations of superposed symbols acquired by superposing first modulated symbols and second modulated symbols mapped according to Table 3 when a1:a2=4:1.

A superposed modulated symbol may be acquired according to a mapping table, such that two sets of information bits may be mapped to a constellation of the nature of Gray mapping, simplifying non-orthogonal multiplexing of information for multiple users.

When the first information bit is of 1 bit, the transmitter may acquire the first modulated symbol by applying first Binary Phase Shift Keying (BPSK) to the first information bit. When the first information bit is of 2 bits, the transmitter may acquire the first modulated symbol by applying first Quadri Phase Shift Keying (QPSK) to the first information bit.

When the second information bit is of 2 bits, the transmitter may acquire the second modulated symbol by applying second QPSK to the second information bit. The second QPSK may be performed as one of mappings as follows, depending on a value of the first information bit. A sign of a real part of a modulated symbol acquired by applying the first QPSK may be flipped. A sign of an imaginary part of the modulated symbol acquired by applying the first QPSK may be flipped. The first QPSK may be performed. Alternatively, both the sign of the real part and the sign of the imaginary part of the modulated symbol acquired by applying the first QPSK may be flipped.

When the second information bit is of 4 bits, the transmitter may acquire the second modulated symbol by applying second 16 Quadrature Amplitude Modulation (QAM) to the second information bit. The second 16 QAM may be performed as one of mappings as follows, depending on the value of the first information bit. A sign of a real part of a modulated symbol acquired by applying 16 QAM may be flipped. A sign of an imaginary part of the modulated symbol acquired by applying the 16 QAM may be flipped. The 16 QAM may be performed. Alternatively, both the sign of the real part and the sign of the imaginary part of the modulated symbol acquired by applying the 16 QAM may be flipped.

When the second information bit is of 6 bits, the transmitter may acquire the second modulated symbol by applying second 64 QAM to the second information bit. The second 64 QAM may be performed as one of mappings as follows, depending on the value of the first information bit. A sign of a real part of a modulated symbol acquired by applying 64 QAM may be flipped. A sign of an imaginary part of the modulated symbol acquired by applying the 64 QAM may be flipped. The 64 QAM may be performed. Alternatively, both the sign of the real part and the sign of the imaginary part of the modulated symbol acquired by applying the 64 QAM may be flipped.

The first modulated symbol may be acquired by modulating the first information bit according to Long Term Evolution (LTE). The second modulated symbol may be acquired by modulating the second information bit according to LTE to acquire a modulated symbol, and flipping a sign of a real part and/or an imaginary part of the modulated symbol, or flipping no sign of the real part and the imaginary part of the modulated symbol, depending on the value of the first information bit, as set by a transmitter and/or a receiver.

For example, algebraic formulas as follows may work as effectively as Table 1 and Table 2 and achieve identical effect.

| No. | 1st info bit | 2nd info bit | 1st modulated symbol | 2nd modulated symbol |
|---|---|---|---|---|
| 1 | b(0)b(1) | b(0)b(1) ... b(n) | $x_0$ | $f(x_0, x_1)$ |

-continued

| No. | 1st info bit | 2nd info bit | 1st modulated symbol | 2nd modulated symbol |
|-----|--------------|--------------|----------------------|----------------------|

The first modulated symbol $x_0$ may be acquired by modulating b(0)b(1) according to LTE. The modulated symbol $x_1$ may be acquired by modulating b(0)b(1) . . . b(n) according to LTE. The n may be 1, 3, or 5. The second modulated symbol $f(x_0, x_1)$ may be a fixed function of $x_0$ and $x_1$. Absolute values of the real part and the imaginary part of $f(x_0, x_1)$ may be identical to those of $x_1$. Signs of the real part and/or the imaginary part of $f(x_0, x_1)$ may differ from those of $x_1$.

A row in the mapping table may include two sets of information bits(b(0)b(1), b(0)b(1) . . . b(n)) and two modulated symbols $(x_0, f(x_0, x_1))$ corresponding respectively to the two sets of information bits. The two modulated symbols may form a set of modulated symbols. Superposition of a set of modulated symbols $(x_0, f(x_0, x_1))$ in the mapping table may be mapped onto the diagram of constellations of the nature of Gray mapping.

Figure 10:
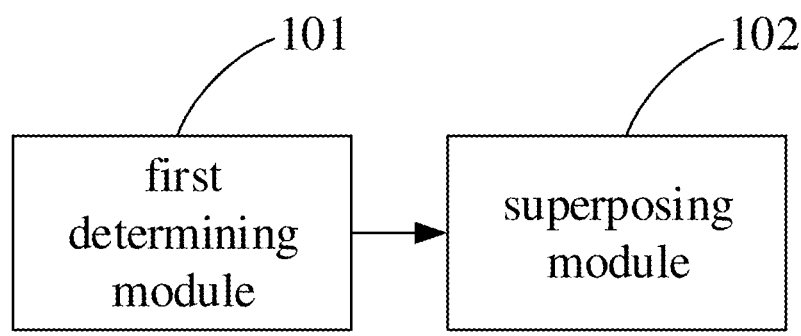
FIG. 10 is a diagram of a structure of a transmitter according to an embodiment herein.

FIG. 10 is a diagram of a structure of a transmitter according to an embodiment herein. As shown in FIG. 10, the transmitter includes a first determining module 101 and a superposing module 102.

The first determining module 101 is arranged for determining, according to a first information bit, a second information bit, and a mapping table, a first modulated symbol and a second modulated symbol. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping.

The superposing module 102 is arranged for acquiring a superposed symbol of the first modulated symbol and the second modulated symbol.

A transmitter determines a first modulated symbol and a second modulated symbol according to a first information bit, a second information bit, and a mapping table. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping. The transmitter acquires a superposed symbol of the first modulated symbol and the second modulated symbol. A superposed modulated symbol may be acquired according to a mapping table, such that two sets of information bits may be mapped to a constellation of the nature of Gray mapping, simplifying non-orthogonal multiplexing of information for multiple users.

The first determining module 101 may be arranged for acquiring the first modulated symbol according to the first information bit and first mapping in the mapping table, and acquiring the second modulated symbol according to the second information bit and second mapping in the mapping table.

The first mapping may correspond to multiple second mappings.

The first determining module 101 may be arranged for:

in response to determining that the first information bit is of 1 bit, acquiring the first modulated symbol by applying first Binary Phase Shift Keying (BPSK) to the first information bit; and in response to determining that the first information bit is of 2 bits, acquiring the first modulated symbol by applying first Quadri Phase Shift Keying (QPSK) to the first information bit.

The first determining module 101 may be arranged for:

in response to determining that the second information bit is of 2 bits, acquiring the second modulated symbol by applying second QPSK to the second information bit, depending on a value of the first information bit, the second QPSK being: flipping a sign of a real part of a modulated symbol acquired by applying the first QPSK, flipping a sign of an imaginary part of the modulated symbol acquired by applying the first QPSK, the first QPSK, or flipping both the sign of the real part and the sign of the imaginary part of the modulated symbol acquired by applying the first QPSK;

in response to determining that the second information bit is of 4 bits, acquiring the second modulated symbol by applying second 16 Quadrature Amplitude Modulation (QAM) to the second information bit, depending on the value of the first information bit, the second 16 QAM being: flipping a sign of a real part of a modulated symbol acquired by applying 16 QAM, flipping a sign of an imaginary part of the modulated symbol acquired by applying the 16 QAM, the 16 QAM, or flipping both the sign of the real part and the sign of the imaginary part of the modulated symbol acquired by applying the 16 QAM; and in response to determining that the second information bit is of 6 bits, acquiring the second modulated symbol by applying second 64 QAM to the second information bit, depending on the value of the first information bit, the second 64 QAM being: flipping a sign of a real part of a modulated symbol acquired by applying 64 QAM, flipping a sign of an imaginary part of the modulated symbol acquired by applying the 64 QAM, the 64 QAM, or flipping both the sign of the real part and the sign of the imaginary part of the modulated symbol acquired by applying the 64 QAM.

The superposing module 102 may be arranged for acquiring the superposed symbol as a linear superposition of the first modulated symbol and the second modulated symbol.

The superposing module 102 may acquire a first weighted modulated symbol as a product of the first modulated symbol and a first power factor, and acquire a second weighted modulated symbol as a product of the second modulated symbol and a second power factor. The first power factor may be a square root of a power share of the first information bit. The second power factor may be a square root of a power share of the second information bit. A total of the power share of the first information bit and the power share of the second information bit may be 1. The superposing module may acquire the superposed symbol as a sum of the first weighted modulated symbol and the second weighted modulated symbol.

Figure 11:
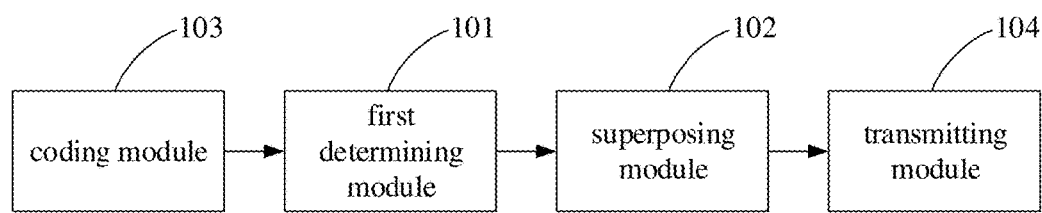
FIG. 11 is a diagram of a structure of a transmitter according to an embodiment herein.

FIG. 11 is a diagram of a structure of a transmitter according to an embodiment herein. As shown in FIG. 11, the transmitter may further include a coding module 103 arranged for acquiring the first information bit by coding a first stream of bits, and acquiring the second information bit by coding a second stream of bits.

The transmitter may further include a transmitting module 104 arranged for forming a signal to be transmitted using the superposed symbol, and transmitting the signal to be transmitted to multiple receivers.

Figure 12:
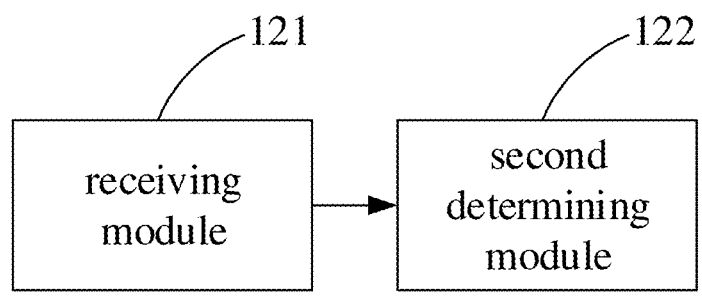
FIG. 12 is a diagram of a structure of a receiver according to an embodiment herein.

FIG. 12 is a diagram of a structure of a receiver according to an embodiment herein. As shown in FIG. 12, the receiver includes a receiving module 121 and a second determining module 122.

The receiving module 121 is arranged for receiving a signal transmitted by a transmitter.

The second determining module 122 is arranged for determining, according to the signal and a mapping table, information sent by the transmitter to the receiver. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping.

A receiver receives a signal transmitted by a transmitter. The receiver determines, according to the signal and a mapping table, information sent by the transmitter to the receiver. The mapping table is for determining a correspondence between the first information bit and the first modulated symbol and a correspondence between the second information bit and the second modulated symbol. Superposition of a set of modulated symbols in the mapping table is mapped onto a diagram of constellations of a nature of Gray mapping. Information for a user is acquired according to a received signal and a mapping table, simplifying demodulation, improving efficiency in non-orthogonal multiplexing of information for multiple users.

The receiver may be a first receiver. The second determining module 122 may be arranged for acquiring the first modulated symbol by applying Maximum Likelihood (ML) or Minimum Mean-Square Error (MMSE) to the signal, acquiring the first information bit by demodulating the first modulated symbol according to the mapping table, and acquiring the information sent by the transmitter to the receiver by decoding the first information bit.

The first receiver may be of a user at the edge.

The receiver may be a second receiver. The second determining module 122 may be arranged for acquiring the first modulated symbol by applying Maximum Likelihood (ML) or Minimum Mean-Square Error (MMSE) to the signal, removing the first modulated symbol from the signal by applying Successive Interference Cancellation (SIC), acquiring the second modulated symbol by applying ML or MMSE, acquiring the second information bit by demodulating the second modulated symbol according to the mapping table, and acquiring the information sent by the transmitter to the receiver by decoding the second information bit.

The second receiver may be of a user near the center.

According to an embodiment herein, transitory or non-transitory computer-readable storage medium has stored therein instructions that, when executed by a processor, cause the processor to perform the modulating method for multi-user information transmission.

According to an embodiment herein, transitory or non-transitory computer-readable storage medium has stored therein instructions that, when executed by a processor, cause the processor to perform the demodulating method for multi-user information transmission.

Those skilled in the art may understand that all or part of the steps according to an embodiment herein may be implemented by a process of a computer program. The computer program may be stored in a transitory/non-transitory computer-readable storage medium. The computer program may be executed on a hardware platform such as a system, equipment, an apparatus, a device, etc. One step or a combination of steps of a method according to an embodiment herein may be executed.

All or part of the steps according to an embodiment herein may be implemented by an Integrated Circuit. The steps may each be made into an Integrated Circuit module. Multiple modules or steps herein may be implemented by being made into a single Integrated Circuit module.

An apparatus or a functional module/unit herein may be implemented using a universal computing apparatus, and may be integrated in a single computing apparatus or distributed in a network formed by multiple computing apparatuses.

When implemented in form of a software functional module and sold or used as an independent product, an apparatus or a functional module/unit herein may be stored in a transitory/non-transitory computer-readable storage medium. The computer-readable storage medium may be a Read Only Memory (ROM), a magnetic disk, a CD, etc.

Embodiments herein are disclosed to help understand the present disclosure with no intention to limit the present disclosure. Those skilled in the art may make any modification and variation to a form and a detail of an embodiment herein without departing from the spirit and scope of the present disclosure. The scope of protection herein shall be defined by that of the claims.

INDUSTRIAL APPLICABILITY

With embodiments herein, A superposed modulated symbol may be acquired according to a mapping table, simplifying modulation, improving efficiency in non-orthogonal multiplexing of information for multiple users.

The invention claimed is:

1. A modulating method for multi-user information transmission, comprising:
    acquiring, by a transmitter, a superposed symbol of a first modulated symbol and a second modulated symbol determined according to a first information bit, a second information bit, and a mapping table,
    the superposed symbol being mapped to a constellation point on a diagram of constellations of a nature of Gray mapping,
    wherein the first modulated symbol is acquired by modulating the first information bit according to Long Term Evolution (LTE),
    wherein the second modulated symbol is acquired by modulating the second information bit according to LTE to acquire a modulated symbol, and flipping a sign of at least one of a real part or an imaginary part of the modulated symbol, or flipping no sign of the real part and the imaginary part of the modulated symbol, depending on a value of the first information bit.

2. The method according to claim 1,
    wherein the transmitter acquires the first modulated symbol according to the first information bit and a first mapping in the mapping table,
    wherein the transmitter acquires the second modulated symbol according to the second information bit and a second mapping in the mapping table.

3. The method according to claim 2, wherein the first mapping corresponds to multiple second mappings.

4. The method according to claim 1,
    wherein in response to determining that the first information bit is of 1 bit, the transmitter acquires the first modulated symbol by applying first Binary Phase Shift Keying (BPSK) to the first information bit, wherein in response to determining that the first information bit is of 2 bits, the transmitter acquires the first modulated symbol by applying first Quadri Phase Shift Keying (QPSK) to the first information bit.

5. The method according to claim 1,
wherein in response to determining that the second information bit is of 2 bits, the transmitter acquires the second modulated symbol by applying second Quadri Phase Shift Keying (QPSK) to the second information bit, depending on the value of the first information bit, the second QPSK being: flipping a sign of a real part of a modulated symbol acquired by applying first QPSK, flipping a sign of an imaginary part of the modulated symbol acquired by applying the first QPSK, the first QPSK, or flipping both the sign of the real part and the sign of the imaginary part of the modulated symbol acquired by applying the first QPSK,
wherein in response to determining that the second information bit is of 4 bits, the transmitter acquires the second modulated symbol by applying second 16 Quadrature Amplitude Modulation (QAM) to the second information bit, depending on the value of the first information bit, the second 16 QAM being: flipping a sign of a real part of a modulated symbol acquired by applying 16 QAM, flipping a sign of an imaginary part of the modulated symbol acquired by applying the 16 QAM, the 16 QAM, or flipping both the sign of the real part and the sign of the imaginary part of the modulated symbol acquired by applying the 16 QAM,
wherein in response to determining that the second information bit is of 6 bits, the transmitter acquires the second modulated symbol by applying second 64 QAM to the second information bit, depending on the value of the first information bit, the second 64 QAM being: flipping a sign of a real part of a modulated symbol acquired by applying 64 QAM, flipping a sign of an imaginary part of the modulated symbol acquired by applying the 64 QAM, the 64 QAM, or flipping both the sign of the real part and the sign of the imaginary part of the modulated symbol acquired by applying the 64 QAM.

6. The method according to claim 1,
wherein the superposed symbol is a linear superposition of the first modulated symbol and the second modulated symbol.

7. The method according to claim 1, wherein the acquiring, by a transmitter, a superposed symbol of a first modulated symbol and a second modulated symbol comprises:
acquiring, by the transmitter, a first weighted modulated symbol as a product of the first modulated symbol and a first power factor, and acquiring a second weighted modulated symbol as a product of the second modulated symbol and a second power factor, the first power factor being a square root of a power share of the first information bit, the second power factor being a square root of a power share of the second information bit, a total of the power share of the first information bit and the power share of the second information bit being 1; and
acquiring, by the transmitter, the superposed symbol as a sum of the first weighted modulated symbol and the second weighted modulated symbol.

8. The method according to claim 1, further comprising:
before the acquiring, by a transmitter, a superposed symbol of a first modulated symbol and a second modulated symbol determined according to a first information bit, a second information bit, and a mapping table, acquiring, by the transmitter, the first information bit by coding a first stream of bits; and
acquiring, by the transmitter, the second information bit by coding a second stream of bits.

9. The method according to claim 1, further comprising:
after the acquiring, by a transmitter, a superposed symbol of a first modulated symbol and a second modulated symbol determined according to a first information bit, a second information bit, and a mapping table,
forming, by the transmitter, a signal to be transmitted using the superposed symbol, and transmitting the signal to be transmitted to multiple receivers.

10. A demodulating method for multi-user information transmission, comprising:
receiving, by a receiver, a signal transmitted by a transmitter; and
determining, by the receiver according to the signal and a mapping table, information sent by the transmitter to the receiver, the mapping table being for determining a correspondence between a first information bit and a first modulated symbol and a correspondence between a second information bit and a second modulated symbol, such that superposition of a set of modulated symbols in the mapping table is mapped onto a diagram of constellations of a nature of Gray mapping,
wherein the first modulated symbol is acquired by modulating the first information bit according to Long Term Evolution (LTE),
wherein the second modulated symbol is acquired by modulating the second information bit according to LTE to acquire a modulated symbol, and flipping a sign of at least one of a real part or an imaginary part of the modulated symbol, or flipping no sign of the real part and the imaginary part of the modulated symbol, depending on a value of the first information bit.

11. The method according to claim 10, wherein the determining, by the receiver according to the signal and a mapping table, information sent by the transmitter to the receiver comprises:
acquiring, by the receiver as a first receiver, the first modulated symbol by applying Maximum Likelihood (ML) or Minimum Mean-Square Error (MMSE) to the signal, acquiring the first information bit by demodulating the first modulated symbol according to the mapping table, and acquiring the information sent by the transmitter to the receiver by decoding the first information bit.

12. The method according to claim 10, wherein the determining, by the receiver according to the signal and a mapping table, information sent by the transmitter to the receiver comprises:
acquiring, by the receiver as a second receiver, the first modulated symbol by applying Maximum Likelihood (ML) or Minimum Mean-Square Error (MMSE) to the signal, removing the first modulated symbol from the signal by applying Successive Interference Cancellation (SIC), acquiring the second modulated symbol by applying ML or MMSE, acquiring the second information bit by demodulating the second modulated symbol according to the mapping table, and acquiring the information sent by the transmitter to the receiver by decoding the second information bit.

13. A transmitter, comprising:
a processor; and
memory storing instructions executable by the processor, wherein the processor is arranged for acquiring a superposed symbol of a first modulated symbol and a second modulated symbol determined according to a first information bit, a second information bit, and a mapping table, the superposed symbol being mapped to a constellation point on a diagram of constellations of a nature of Gray mapping, wherein the first modulated symbol is acquired by modulating the first information bit according to Long Term Evolution (LTE), wherein the second modulated symbol is acquired by modulating the second information bit according to LTE to acquire a modulated symbol, and flipping a sign of at least one of a real part or an imaginary part of the modulated symbol, or flipping no sign of the real part and the imaginary part of the modulated symbol, depending on a value of the first information bit.

14. The transmitter according to claim 13, wherein the processor is arranged for:

in response to determining that the first information bit is of 1 bit, acquiring the first modulated symbol by applying first Binary Phase Shift Keying (BPSK) to the first information bit; and in response to determining that the first information bit is of 2 bits, acquiring the first modulated symbol by applying first Quadri Phase Shift Keying (QPSK) to the first information bit.

15. The transmitter according to claim 13, wherein the processor is arranged for:

in response to determining that the second information bit is of 2 bits, acquiring the second modulated symbol by applying second Quadri Phase Shift Keying (QPSK) to the second information bit, depending on the value of the first information bit, the second QPSK being: flipping a sign of a real part of a modulated symbol acquired by applying first QPSK, flipping a sign of an imaginary part of the modulated symbol acquired by applying the first QPSK, the first QPSK, or flipping both the sign of the real part and the sign of the imaginary part of the modulated symbol acquired by applying the first QPSK;

in response to determining that the second information bit is of 4 bits, acquiring the second modulated symbol by applying second 16 Quadrature Amplitude Modulation (QAM) to the second information bit, depending on the value of the first information bit, the second 16 QAM being: flipping a sign of a real part of a modulated symbol acquired by applying 16 QAM, flipping a sign of an imaginary part of the modulated symbol acquired by applying the 16 QAM, the 16 QAM, or flipping both the sign of the real part and the sign of the imaginary part of the modulated symbol acquired by applying the 16QAM; and in response to determining that the second information bit is of 6 bits, acquiring the second modulated symbol by applying second 64 QAM to the second information bit, depending on the value of the first information bit, the second 64 QAM being: flipping a sign of a real part of a modulated symbol acquired by applying 64 QAM, flipping a sign of an imaginary part of the modulated symbol acquired by applying the 64QAM, the 64 QAM, or flipping both the sign of the real part and the sign of the imaginary part of the modulated symbol acquired by applying the 64 QAM.

16. The transmitter according to claim 13, wherein the processor is arranged for acquiring the superposed symbol as a linear superposition of the first modulated symbol and the second modulated symbol.

17. The transmitter according to claim 13, wherein the processor is arranged for: acquiring a first weighted modulated symbol as a product of the first modulated symbol and a first power factor, and acquiring a second weighted modulated symbol as a product of the second modulated symbol and a second power factor, the first power factor being a square root of a power share of the first information bit, the second power factor being a square root of a power share of the second information bit, a total of the power share of the first information bit and the power share of the second information bit being 1; and acquiring the superposed symbol as a sum of the first weighted modulated symbol and the second weighted modulated symbol.

18. A receiver, comprising:

a processor; and memory storing instructions executable by the processor, wherein the processor is arranged for:

receiving a signal transmitted by a transmitter; and determining, according to the signal and a mapping table, information sent by the transmitter to the receiver, the mapping table being for determining a correspondence between a first information bit and a first modulated symbol and a correspondence between a second information bit and a second modulated symbol, such that superposition of a set of modulated symbols in the mapping table is mapped onto a diagram of constellations of a nature of Gray mapping, wherein the first modulated symbol is acquired by modulating the first information bit according to Long Term Evolution (LTE), wherein the second modulated symbol is acquired by modulating the second information bit according to LTE to acquire a modulated symbol, and flipping a sign of at least one of a real part or an imaginary part of the modulated symbol, or flipping no sign of the real part and the imaginary part of the modulated symbol, depending on a value of the first information bit.

19. The receiver according to claim 18, wherein the receiver is a first receiver, and the processor is arranged for acquiring the first modulated symbol by applying Maximum Likelihood (ML) or Minimum Mean-Square Error (MMSE) to the signal, acquiring the first information bit by demodulating the first modulated symbol according to the mapping table, and acquiring the information sent by the transmitter to the receiver by decoding the first information bit.

20. The receiver according to claim 18, wherein the receiver is a second receiver, and the processor is arranged for acquiring the first modulated symbol by applying Maximum Likelihood (ML) or Minimum Mean-Square Error (MMSE) to the signal, removing the first modulated symbol from the signal by applying Successive Interference Cancellation (SIC), acquiring the second modulated symbol by applying ML or MMSE, acquiring the second information bit by demodulating the second modulated symbol according to the mapping table, and acquiring the information sent by the transmitter to the receiver by decoding the second information bit.

* * * * *